April 7, 1964 G. KIPER 3,127,822
CONTROLS FOR AT LEAST PARTLY AUTOMATIC CAMERAS
Filed Nov. 6, 1961 3 Sheets-Sheet 1

INVENTOR.
GERD KIPER
BY
Michael S. Striker
Attorney

INVENTOR.
GERD KIPER
BY
Michael S. Striker
Attorney

INVENTOR.
GERD KIPER

United States Patent Office 3,127,822
Patented Apr. 7, 1964

3,127,822
CONTROLS FOR AT LEAST PARTLY
AUTOMATIC CAMERAS
Gerd Kiper, Unterhaching, near Munich, Germany, assignor to Agfa Aktiengesellschaft, Leverkusen-Bayerwerk, Germany
Filed Nov. 6, 1961, Ser. No. 150,315
Claims priority, application Germany Dec. 8, 1960
30 Claims. (Cl. 95—10)

The present invention relates to cameras.

More particularly, the present invention relates to cameras which are capable of being automatically operated, in accordance with the lighting conditions, at least in part. For example, there are known cameras which are capable of automatically setting the exposure time and the diaphragm aperture in accordance with the lighting conditions, as well as cameras where the operator may select either the exposure time or the diaphragm aperture.

Cameras of this type are relatively complex and expensive. For example, such cameras conventionally include differential mechanisms for adding together the settings of the exposure time and the exposure aperture to provide a total exposure value which by operation of the differential mechanism corresponds to a given light value. Moreover, these conventional structures are limited in that, for example, one of the exposure controlling factors such as the exposure time, for example, must be reduced from a maximum to a minimum value before the other of the exposure factors, the exposure aperture, is changed, and the pre-set manner in which the camera must be operated is not universally suited to all conditions under which the photograph is made.

It is a primary object of the present invention to provide an at least partly automatic camera which is far simpler than known camera structures which are at least partly automatic. For example, with the camera of the invention there are no complex differential mechanisms of the type referred to above.

Another object of the present invention is to provide a camera where the operator, without making any special adjustments, can operate the camera at his own option either in a fully manual manner or in an at least partly automatic manner.

It is also an object of the present invention to provide a camera which can be operated either in a fully manual or in a fully automatic manner.

Still another object of the present invention is to provide a camera which is not only capable of being operated in a fully automatic or in a fully manual manner, but which also is operable in a partly automatic manner giving the operator a choice as to whether he wishes to make a preselection of the exposure time or the exposure aperture.

An additional object of the present invention is to provide an automatic camera which can be very easily adapted to provide a fully automatic operation in which the exposure time will be changed throughout its entire range before the exposure aperture is changed or in which the exposure aperture is changed throughout its entire range before the exposure time is changed.

The objects of the present invention also include the provision of a camera which readily indicates to the operator not only the settings of the exposure time and the exposure aperture but also whether or not under the particular photographing conditions a proper exposure can be made.

A still further object of the present invention is to provide a camera of the above type which can be set according to light values rather than a selected combination of exposure time and aperture.

Also the objects of the present invention include the provision of a camera which enables the operator to very readily alter the combinations of exposure time and aperture while maintaining the light value constant.

Among the objects of the present invention is also the provision of a camera capable of accomplishing all of the above objects and at the same time composed of simple rugged elements which operate very reliably and which occupy a relatively small space so that a rugged, reliable, compact construction is provided.

With these objects in mind, the invention includes, in a camera, a diaphragm means which includes a pair of rotary diaphragm rings operatively connected to the blades of the diaphragm for controlling these blades. The exposure aperture will be changed only when these diaphragm rings angularly move relative to each other. As long as they turn together there is no change in the aperture. One of the diaphragm rings is provided with an exposure time controlling structure so that during simultaneous turning of both rings the exposure timer will be adjusted while the aperture remains unchanged. A light-responsive means cooperates with the other of the diaphragm rings for turning the latter ring, and if the diaphragm ring which controls the exposure time remains stationary while the light-responsive means turns the other ring, then of course the exposure time will remain unchanged while the light-responsive means acts to set the aperture automatically.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary, partly sectional elevational view of one embodiment of a structure according to the present invention;

FIG. 2 fragmentarily illustrates another embodiment of a structure according to the invention;

Figure 1:
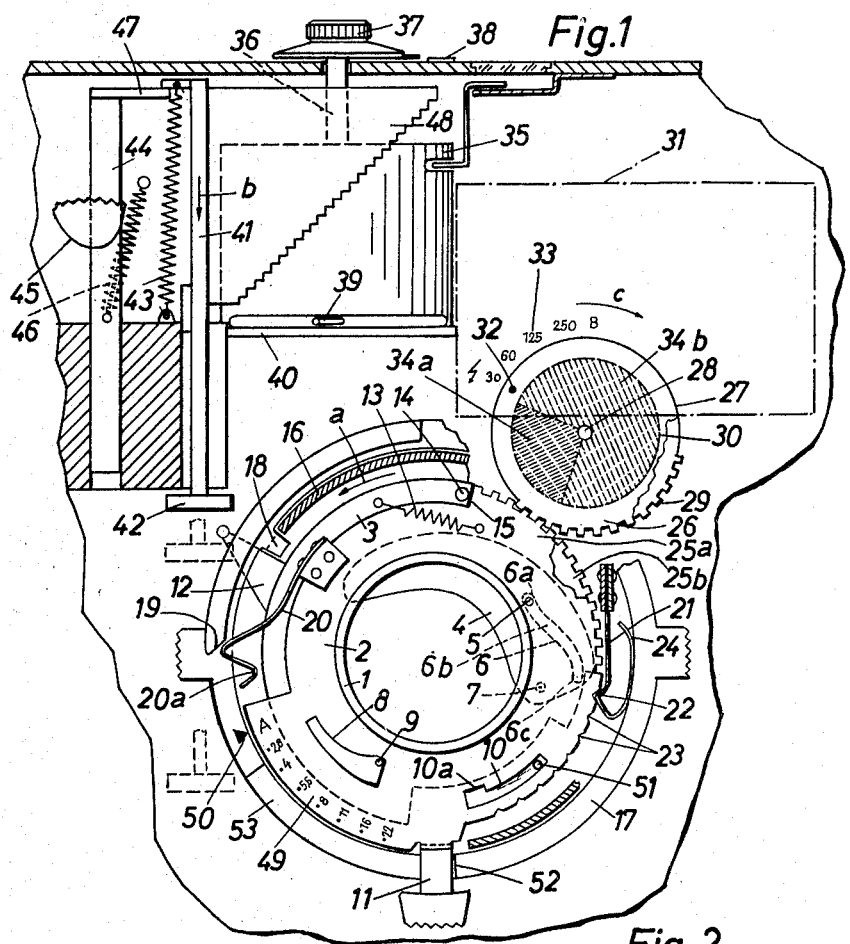

Referring now to FIG. 1, there is shown therein a central inner tube 1 of the objective assembly, the axis of the tube 1 coinciding with the axis of the objective. The structure of the invention includes a diaphragm means which includes a pair of rotary diaphragm rings 2 and 3 which are turnably carried by the tube 1 for rotary movement about the optical axis. These rotary diaphragm rings 2 and 3 are operatively connected to the blades of the diaphragm for controlling these blades, and, for the sake of clarity, only one diaphragm blade 4 is illustrated in FIG. 1. The rotary diaphragm ring 2 fixedly carries a plurality of pins 5 which respectively extend into the elongated slots 6 which are formed in the several diaphragm blades 4, respectively, and each slot 6 has three portions 6a, 6b, and 6c. Only the intermediate portion 6b of each slot 6 is an active portion which will result in changing the size of the diaphragm since the end portions 6a and 6c of each slot 6 respectively extend along circles whose center is in the optical axis so that during turning of the ring 2 while the pin 5 is located either in the portion 6a or in the portion 6c of the slot 6 of a blade 4 the blade 4 will not turn. The other rotary diaphragm ring 3 fixedly carries pins 7 which respectively extend into openings of the several blades 4 so that these blades are pivotally connected to the ring 3, and it is clear that with this construction any relative turning of the rings 2 and 3 one relative to the other, while the pin 5 is in the portion 6b of the slot 6, will result in changing the size of the aperture of the diaphragm.

In accordance with the present invention one of the rotary diaphragm rings, the ring 2 in the illustrated example, is operatively connected to the exposure time setting means of the camera so that the exposure time will be set whenever the ring 2 turns about the optical axis, and for this purpose the ring 2 is formed with a camming edge 8 which cooperates with a pin 9 which in a known way is connected with the retarding mechanism of the exposure time determining structure so as to set this retarding mechanism to provide a predetermined exposure time according to that portion of the camming edge 8 which engages the pin 9. The exposure time controlling structure, which is to say the retarding mechanism, may be of the construction shown in the copending application S.N. 150,316, filed simultaneously with the instant application and entitled, Camera Capable of Being Manually and Automatically Operated, this latter application having the same applicant as the instant application. The retarding mechanism used with the embodiments of the invention described below may also have the structure shown in the latter application, or any conventional exposure time determining structure may be used.

In addition to being formed with a cutout which provides the camming edge 8 which controls the exposure time, the ring 2 is also formed with a cutout 10 which cooperates in a well known manner not forming part of the present invention with a pin 51 to set the camera in the B position where the duration of the opening of the shutter will be determined in a purely manual manner by the operator. The ring 2 is capable of being manually turned and for this purpose a manually engageable means in the form of a projection 11 is fixed to and extends from the ring 2, this manually engageable means 11 extending to the exterior of the camera so as to be accessible to the operator, and thus the operator may manually determine the angular position of the ring 2. It is apparent that whenever the ring 2 is turned by the operator the exposure time will be changed, although if the ring 3 turns together with the ring 2 so that there is no relative turning between these rings the aperture will remain unchanged.

The diaphragm ring 3 is fixedly connected with an outwardly directed projection 12 which is acted upon by a light-responsive means described below so that the turning of the ring 3 can be carried out in a fully automatic manner in accordance with the lighting conditions.

A means is provided for releasably holding the rings 2 and 3 in a predetermined angular position relative to each other, and this releasable holding means includes the pair of portions 14 and 15 of the rings 3 and 2, these portions engaging each other in the position of the parts shown in FIG. 1, and in addition this releasable holding means includes a spring 13 connected to the rings 2 and 3 so as to urge the portions 14 and 15 toward and into engagement with each other. The portion 14 is in the form of a pin fixed to and extending from the ring 3 forwardly in the direction of the optical axis, while the portion 15 is simply a radial edge portion of the ring 2 at the outer periphery thereof, so that the spring 13 will releasably and yieldably maintain the portions 14 and 15 in engagement with each other to provide a means for releasably holding the rings 2 and 3 in the angular position relative to each other which is illustrated in FIG. 1. It will be noted that in this illustrated relative position of the rings 2 and 3 the blades 4 are spaced at a substantial distance from the optical axis and provide, in fact, the largest aperture of the diaphragm means. The spring 13 urges the ring 3 to turn in a direction opposite to that indicated by the arrow a until the pin 14 engages the edge 15 of the ring 2.

The objective assembly shown in FIG. 1 includes an outer tube 16 which is stationary and which is coaxial with the tube 1, and this tube 16 serves to support for rotation a manually operable means in the form of a ring 17 which is accessible to the operator and which includes an inwardly directed projection 18 extending through a suitable slot of the tube 16 and located directly next to the projection 12 of the ring 3, so that when the ring 17 is manually turned in the direction of the arrow a, the projection 18 by its engagement with the projection 12 will cause the rotary manually operable means 17 to turn the ring 3 in the direction of the arrow a shown in FIG. 1. The ring 17 is formed with an elongated slot or notch 53 through which the manually engageable means 11 extends freely, and in the position of the parts shown in FIG. 1 the end 52 of the notch or slot 53 is located directly next to the projection 11 so that when the operator turns this projection 11 in a counterclockwise direction, as viewed in FIG. 1, not only will the ring 2 be turned in the same direction, but in addition the ring 17 will turn together with the ring 2 and of course as a result of the cooperation of the parts 18 and 12 the ring 3 will also turn in the same direction, so that this turning of the projection 11 by the operator will result only in changing the exposure time since the relative position between the rings 2 and 3 will remain unchanged. The ring 17 is formed with a surface portion 19 which cooperates with a curved portion of a leaf spring 20 to press the free end portion 20a of this leaf spring against a peripheral portion of the ring 3, the leaf spring 20 being fixedly carried by the ring 2. Thus, the leaf spring 20 while carried by the ring 2 and fixed to the latter for turning movement therewith has its free end portion 20a extending into the plane which is occupied by the ring 3 and located adjacent the periphery of the ring 3. This ring 20 forms a releasable holding means for a purpose described below. Thus, assuming that the ring 2 remains stationary to maintain the selected exposure time and as it is only desired to turn the ring 3, this turning will of course take place during tensioning of and in opposition to the spring 13, and at this time the ring 17, while it turns the ring 3 during cooperation of the projections 18 and 12, will also turn relative to the spring 20 which is fixed to the now stationary ring 2, so that the inner periphery of the ring 17 will press the spring 20 inwardly to provide a frictional resistance to the turning of the ring 3, and this frictional resistance while not great enough to prevent manual turning of the ring 3 by way of the ring 17 is at the same time too great to allow the ring 3 to be returned by the spring 13 to the position where the pin 14 engages the edge 15, so that in this way the ring 3 will be releasably maintained by this releasable holding means in the angular position in which it is manually turned by way of the ring 17, so that the manually selected aperture will be retained.

In order to releasably hold the diaphragm ring 2 in the angular position which provides a predetermined or preselected exposure time, an additional releasable holding means is provided, and this latter holding means includes the leaf spring 21 which is fixedly carried by a stationary part of the objective assembly and which includes an intermediate V-shaped portion 22 cooperating with the series of notches 23 formed in the periphery of the ring 2, so that this releasable holding means is in the form of a detent mechanism. Beyond its portion 22 the leaf spring 21 includes a free end portion 24 which frictionally engages the inner periphery of the ring 17, so that the ring 17 itself serves to prevent yielding of the spring 21 in a radially outward direction which would not permit the releasable holding means to act properly to maintain the ring 2 in its selected angular position. Thus, this leaf spring 21 by cooperation with the ring 17 and the ring 2, at the notches 23 of the latter, releasably maintains the ring 2 in the position to which it is manually turned by the operator by way of the projection 11. A means is provided for indicating to the operator the settings of the camera, and this means includes a pair of movable members 27 and 30. The movable indicating members 27 and 30 are connected by a pair of identical transmission means respectively with the rings 2 and 3 so that in response to turning of the rings 2 and 3 these movable members 27 and 30 will be moved with exactly the same transmission ratio. The transmission means includes a toothed portion 25a extending along part of the periphery of the ring 2 and an identical toothed portion 25b extending along part of the periphery of the ring 3. In addition, this transmission means includes the gear sector portion 26 of the movable member 27 meshing with the teeth 25a and the identical gear sector portion 29 of the movable member 30 meshing with the teeth 25b. These movable portions 27 and 30 are in the form of rotary discs supported for rotary movement by a common pin or rod 28 which extends parallel to the optical axis and which is supported by any suitable structure so that the members 27 and 30 will turn about the axis of the rod 28 which coincides with the axis of the discs 27 and 30. The indicator members 27 and 30 extend into the interior portion of the viewfinder of the camera, for example, or into overlapping relation with any suitable window 31 of the camera through which light may enter so as to render the upper portions of the indicator members 27 and 30 visible in the manner indicated in FIG. 1 where the outline of the window 31 is shown in dot-dash lines. This window 31 may be either a window of the viewfinder or a window behind which is located marks indicating the limits of the frame area visible in the viewfinder and coinciding with the frame of the film which is to be exposed, such frame limits being projected in a well known manner into the field of the viewfinder, and of course the indicator members 27 and 30 at their portions which overlap the window 31 would be projected together with the other structure located behind the window 31 into the field of the viewfinder. At least those portions of the indicator members 27 and 30 which extend into the passage which receives light through the window 31 are translucent so that light can pass therethrough. The indicator member 27 has an indicating portion which carries an index 32, and a stationary indicating portion, which may be formed by part of the window 31, carries a scale 33 of exposure times, so that the index 32 and scale 33 cooperate to indicate to the operator the exposure time set into the camera. In the illustrated example the longest exposure time of 1/30 sec. has been set into the camera. Of course, if desired, the index 32 may be stationary and carried by the window 31 and the scale of exposure times may be carried by the movable indicating member 27. The rotary indicating member 30 has a pair of contrasting colored portions 34a and 34b which cooperate with the index 32 in order to indicate whether or not a proper exposure can be made, as pointed out below.

The light-responsive means which cooperates with the rotary diaphragm ring 3 through the projection 12 thereof includes the light meter 35 which in a conventional manner may be actuated by a photocell, for example, and this light meter 35 is supported for rotary movement about its axis and is fixed to a rod 36 which extends freely through the top wall of the camera and is fixed to a knob 37 accessible at the upper part of the camera. The knob 37 carries an index which cooperates with the scale 38 of film speeds, so that the operator by turning the knob 37 will set the meter 35 at an angular position corresponding to the film speed. The light meter includes a movable pointer 39 which assumes positions according to the lighting conditions, and this pointer 39 moves freely over a support 40 which limits the deflection of the pointer 39 by a scanning element 48 which scans the position of the pointer 39. This scanning element 48 of the light-responsive means is carried by a rod 41 which is guided for vertical movement and which carries at its lower end an enlarged portion 42 in whose path of movement the free end of the projection 12 is located. A spring 43 is connected at one end to a stationary part of the camera and at its upper end, as viewed in FIG. 1, to an upper plate fixed to rod 41 for urging the rod 41 downwardly in the direction of the arrow b as shown in FIG. 1, so that when the rod 41 is released to the spring 43 the scanning member 48 will move downwardly into engagement with the pointer 39, and of course the extent of downward movement of the rod 41 will be determined in this way by the lighting conditions. Parallel to the rod 41 is located a plunger 44 which is also guided for vertical movement and which is fixedly connected with a manually engageable element 45 which is accessible to the operator at the exterior of the camera. A return spring 46, which is stronger than the spring 43, is fixed at its upper end to a stationary part of the camera and at the lower end to the plunger 44 to urge the latter upwardly to the position shown in FIG. 1, and at its upper end the plunger 44 has a projection 47 extending beneath the projection at the upper end of the rod 41 so that the return spring 46 maintains the spring 43 tensioned and releasably maintains the light-responsive means in the position shown in FIG. 1 until the operator manually moves the element 45 downwardly.

To enable the operator to provide a selected aperture of the diaphragm means, the rotary diaphragm ring 2 and the rotary manually operable member 17 have connected to each other a pair of indicating portions one of which carries a scale of diaphragm values as well as a symbol A indicating the automatic setting of the camera and the other of which carries an index. Thus, in the example shown in FIG. 1 the lower left portion of the ring 2 is the indicating portion which carries the scale 49 of aperture sizes, and this scale includes the symbol A indicating the setting for automatic operation of the camera, and the manually turnable ring 17 carries an index 50 which cooperates with the scale 49, the index 50 being shown in FIG. 1 in alignment with the symbol A of the scale, so that in the illustrated position the parts are set for automatic operation.

The parts are shown in FIG. 1 in the position they take when the camera is set for automatic determination of the aperture of the diaphragm with an exposure time of 1/30 sec. In the event that it is desired to provide a camera setting which would include an exposure time different from 1/30 sec., the manual engagement means 11 and thus the ring 2 is turned in the direction of the arrow a so that the ring 17 by engagement of the end 52 of the cutout 53 and the projection 11 and of course ring 3 by engagement of the portions 14 and 15 will all turn together with the ring 2 as a unit during manual setting of a selected exposure time. Since both of the rings 2 and 3 turn together at this time as a unit, the aperture remains unchanged. During the turning of the rings 2 and 3 the rotary indicating members 27 and 30 will also turn, this turning taking place in the direction of the arrow c shown in FIG. 1, and the manually engageable means 11 is turned in this way until the desired exposure time of the scale 33 is aligned with the index 32.

Having thus set the exposure time, all that is now required, with the camera set in the position shown in FIG. 1 to provide automatic determination of the aperture, is manual depression of the element 45 so that the plunger 44 is now moved manually downwardly in opposition to the spring 46, and of course the spring 43 is now free to act upon the rod 41 so that the latter follows the downward movement of the plunger 44. This downward movement of the rod 41 continues until the scanning element 48 engages the pointer 39 and presses it against the support 40 which permits only a limited extremely small deflection of the pointer 39 so that the light meter 35 cannot be undesirably influenced by this scanning operation. During the downward movement of the rod 41 the bottom end portion 42 thereof will approach the projection 12 of the ring 3. After an initial relatively small amount of free movement, the end 42 of the rod 41 will engage the projection 12 and move the latter downwardly so as to turn the ring 3 in the direction of the arrow $a$, and in this way the pins 7 will cause the blades 4 to be displaced with respect to the pin 5 so that when these pins 5 are located in the intermediate portions $6b$ of the slots of the blades 4 the diaphragm aperture will change, and in the illustrated example the diaphragm aperture will become continuously smaller, the ring 2 remaining at this time in the position in which it has been manually set to provide the selected exposure time. The ring 2 is retained in this position by the releasable holding means formed by the spring 21 and the notches 23 cooperating therewith. Of course, the rod 41 moves the ring 3 through the projection 12 thereof in opposition to the spring 13 which becomes tensioned to an increasing degree as the rod 41 continues to move downwardly. At the end of the downward movement of the rod 41 when the scanning member 48 engages the pointer 39 of the light meter 35, the diaphragm will have been automatically set at a position providing an exposure aperture which will provide a proper exposure of the film taking into account the speed of the film as well as the preselected exposure time and the lighting conditions.

With the element 45 maintained in its depressed condition the operator need only release the unillustrated shutter so as to make the exposure.

The turning of the diaphragm ring 3 has of course resulted in the simultaneous turning of the indicator member 30 in the direction of the arrow $c$, and thus the field $34a$ moves into a position opposite the pointer or index 32. The greater the extent of turning of the ring 3 with respect to the ring 2 the more the indicator field $34a$ will turn in the direction of the arrow $c$. Thus, as the aperture becomes progressively smaller the field $34a$ will turn progressively with respect to the index 32 to an increasing degree where the lower end of the field $34a$, as viewed in FIG. 1, approaches continuously toward the index 32. As long as a part of the field $34a$ is aligned with the index 32 the exposure will be proper for the given choice of film, exposure time, and lighting conditions.

In the event that the amount of light which is available is insufficient to provide a proper exposure even with the largest aperture of the diaphragm and with the selected exposure time and film, then the scanning element 48 will move downwardly through such a short distance that the end 42 of the rod 41 will perhaps engage the projection 12 but probably will not turn it. In this event, as may be seen in FIG. 1, the field $34b$ will be aligned with the index 32, and the operator will know that automatic regulation of the diaphragm to provide a proper exposure is not possible with the particular combination of lighting conditions, film, and exposure time. It may be possible to make a proper exposure by choosing a longer exposure time under these conditions, but assuming that the longest exposure time is chosen and the field $34b$ is still in alignment with the index 32, then the operator knows that the film in the camera cannot be properly exposed under the particular lighting conditions.

In the event that there is too much light available to make an exposure with the particular combination of film, exposure time, and lighting conditions, then the ring 3 will turn to such an extent that the pin 5 of the blades 4 will be received in the portion $6c$ of the slot 6 of the several diaphragm blades. Thus, at this time while the smallest exposure aperture is provided the ring 3 can continue to turn without further reducing the exposure aperture, but at this time the ring 30 will continue to turn and the extent of turning will be such that the entire field $34a$ will have moved beyond the index 32 and the field $34b$ will again be aligned with this index so the operator again knows that a proper exposure cannot be made.

After release of the element 45 by the operator the spring 46 will of course return the plunger 44 to the position illustrated in FIG. 1, and this will result in returning the rod 41 and the scanning member 48 to the rest position illustrated in FIG. 1, the spring 43 being tensioned at this time. This return movement of the rod 41 releases the ring 3 to the spring 13 which was tensioned in the manner described above during turning of the ring 3 by the light-responsive means, and thus the spring 13 will return the ring 3 to the position illustrated in FIG. 1, the ring 3 turning at this time in a direction opposite to that indicated by the arrow $a$. The turning of ring 3 continues until the pin 14 of the ring 3 engages the edge 15 of ring 2. The ring 2 of the diaphragm remains in the position in which it has been placed manually by the operator.

In the event that it is desired to operate the camera of FIG. 1 in a fully manual manner so that the diaphragm as well as the exposure time are manually set, then the operator, in order to introduce a selected exposure aperture manually, need only turn the ring 17 in the direction of the arrow $a$ until the index 50 is aligned with a selected exposure aperture value of the scale 49. The projection 18 of the ring 17 will of course cooperate with the projection 12 of the ring 3 to turn the latter in opposition to the spring 13 until the selected exposure aperture is provided. The movement of the index 50 from the graduation A of the scale 49 to the next graduation which indicates the largest exposure aperture corresponds to the angular turning of the ring 3 which will displace the entire portion $6a$ of each slot 6 with respect to the pin 5 therein, so that when the index 50 reaches the first graduation of the scale 49 which indicates the largest exposure aperture the pin 5 will be located at the end of the portion $6b$ of the slot 6. Thus, during turning of the index 50 from the symbol A to the next graduation of the scale 49, there will be no change in the size of the exposure aperture. Simultaneously with this turning of the ring 17 the edge portion 19 thereof will slide with respect to the spring 20 and the end $20a$ thereof will engage the periphery of the ring 3, so that the frictional resistance between the end portion $20a$ of the spring 20 and the edge of ring 3 will be greater than the force of the spring 13 so that this spring will not be capable of returning the ring 3 to its rest position from the position manually determined by the operator at this time. Therefore when operator releases the ring 17 after placing the index 50 in alignment with a desired graduation of the scale 49, the ring 17 as well as the ring 3 will remain in the positions which they are turned to by the operator and the spring 13 will be incapable of returning the parts to their rest position since it is incapable of overcoming the force of friction between the spring 20 and the periphery of the ring 3. Of course, the ring 2, whose angular position provides the manually determined exposure time, does not follow the movement of the ring 3 since the releasable holding means 21—23 at this time maintains the ring 2 stationary.

In the event that the exposure time has not yet been set according to the wishes of the operator, the operator is perfectly free to turn the ring 2 even after the setting of the desired exposure aperture so as to change the exposure time. Of course, at this time the end 52 of the cutout 53 will not be located directly next to the manually engageable means 11 which is engaged by the operator to turn the ring 2 in order to change the exposure time, but the ring 17 at this time has its inner periphery pressing the spring 20 at its portion $20a$ against the periphery of the ring 3, so that the spring 20 which is fixed to the ring 2 serves to frictionally couple the ring 17 to the ring 2 for turning movement therewith at this time, and thus the rings 17 and 3 will turn as a unit together with the ring 2 so that the exposure aperture will remain unchanged while the operator sets the exposure time. Thus, all that happens at this time is that the camming edge 8 moves relative to the pin 9 to position the later to provide the selected exposure time, and of course this turning of the ring 2 will result in turning of the index 32 with respect to the scale 33 so that the operator can see the exposure time which is manually set into the camera.

In the event that it is desired to place the camera in the B position so as to provide manual determination of the exposure time by manually maintaining the shutter open, then the operator turns the ring 2 in the manner described above until the index 32 reaches the graduation B of the scale 33, and at this time the angular position of the ring 2 is such that the left end of the edge 8 has reached the pin 9 and the left wider portion 10a of the slot 10 has reached the pin 51, and when the shutter releasing plunger is now actuated by the operator the pin 51 can move into the portion 10a of the slot 10 so that the blades of the shutter will in a well known manner remain in their open positions until the operator manually releases the shutter-operating plunger.

Figure 2:
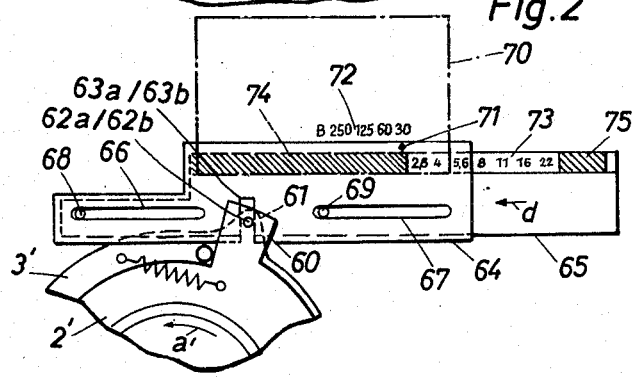

The embodiment of the invention which is illustrated in FIG. 2 is identical with that of FIG. 1 except for the structure of the indicating means which indicates the settings of the camera. Instead of being provided with the toothed portions 25a and 25b, the rotary diaphragm rings 2′ and 3′ of FIG. 2, these rings corresponding to the rings 2 and 3 of FIG. 1, respectively, are provided with projections 60 and 61, respectively. These projections respectively carry a pair of pins 62a and 62b which extend parallel to the optical axis and which in the position illustrated in FIG. 2 are located in line one behind the other. These pins 62a and 62b respectively extend into notches 63a and 63b which are respectively formed with a pair of movable indicating members 64 and 65 which move linearly to the left or right as viewed in FIG. 2. The indicating members 64 and 65 are each formed with a pair of elongated slots 66 and 67 respectively receiving stationary pins 68 and 69 carried by a stationary part of the camera and extending parallel to the optical axis, so that in this way the indicating members 64 and 65 are guided for horizontal movement to the left or right.

The upper portions of the indicating members 64 and 65 extend into a region which is visible to the operator through the window 70, in a manner similar to the indicating members of FIG. 1, and this window 70 may be, for example, a viewfinder window. These members 64 and 65 are transparent or translucent at least at their portions which are visible through the window 70. The movable indicating member 64 carries an index 71 which cooperates on the one hand with a stationary scale of exposure times 72 directly carried by the window 70, and on the other hand with a scale of aperture sizes 73 carried by the movable indicating member 65. This movable indicating member 65 is provided at the ends of the scale 73 with fields 74 and 75 which have a color contrasting with that of the scale 73, this color being red, for example.

When it is desired with the embodiment of FIG. 2 to have the aperture determined automatically, the exposure time is manually preselected, and in making the manual selection of the exposure time the rings 2′ and 3′ turn as a unit in the direction of the arrow a′, as described above in connection with the rings 2 and 3 of FIG. 1. This turning of the rings 2′ and 3′ during manual selection of the exposure time causes the pins 62a and 62b to move the indicating members 64 and 65 in the direction of the arrow d, but since the pair of transmission means between the rings 2′ and 3′ and the indicating members 64 and 65, respectively, both have the same transmission ratio, these indicating members 64 and 65 move at this time as a unit without any relative movement therebetween, so that the index 71 moves along the scale 72 for indicating the exposure time to the operator, while the scale 73 remains in the position illustrated in FIG. 2 with respect to the index 71. Thus, the index 71 remains aligned with the right end portion of the field 74, as viewed in FIG. 2.

After the exposure time has thus been manually preselected, the operator moves the member 45 downwardly to release the light-responsive means for operation in the manner described above in connection with FIG. 1, and in this way the ring 3′ will be automatically turned with respect to the ring 2′ which remains stationary, and the aperture will in this way be automatically determined in accordance with the selected exposure time and in accordance with the speed of the film which is in the camera, as described above in connection with FIG. 1. Thus, at this time the indicating member 64 will remain stationary, since the ring 2′ remains stationary, and the indicating member 65 will move in the direction of the arrow d with respect to the indicating member 64 so that the scale 73 will shift with respect to the index 71. At the end of the movement of the ring 3′, the scale 73 will have with respect to the index 71 a position which will indicate to the operator the aperture which has been automatically set into the camera.

In the event that there is insufficient light to make a proper exposure, then the ring 3′ will not be turned by the light-responsive means, and the index 71 will therefore remain in alignment with the field 74 so as to indicate to the operator that a proper exposure cannot be made. On the other hand, if the amount of light available is so great that a proper exposure cannot be made, then the ring 3′ will be turned by the light-responsive means through such a large angle that the entire scale 73 will move past and beyond the index 71 so that at this time the field 75 will be aligned with the index 71, thus again indicating to the operator that a proper exposure cannot be made.

Of course, it is possible with the structure of FIG. 2 for the operator to set the aperture manually, as well as the exposure time, in the manner described above in connection with FIG. 1, and at this time the scales 72 and 73 will cooperate with the index 71 for indicating the manual settings made by the operator.

Figure 3:
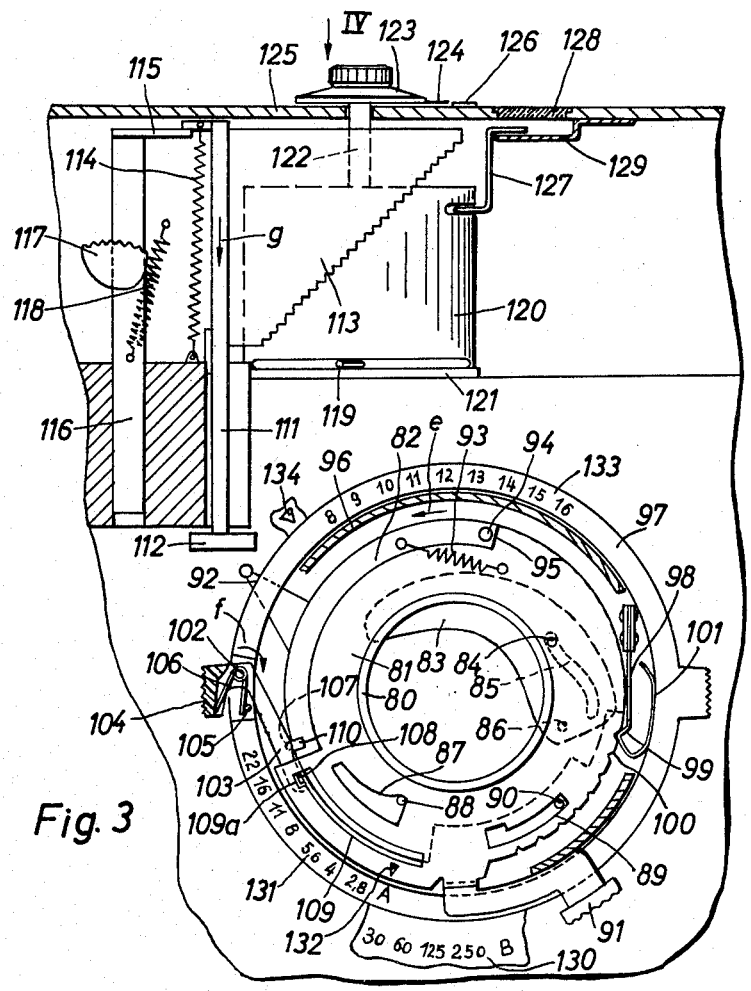
FIG. 3 is a fragmentary, partly sectional, elevational view of a third embodiment of a structure according to the present invention.
Figure 4:
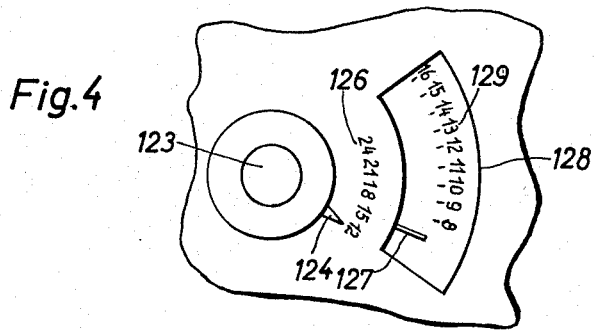
FIG. 4 is a fragmentary top plan view of the structure of FIG. 3 as seen in the direction of the arrow IV indicated at the top part of FIG. 3.

With the embodiment of the invention which is illustrated in FIGS. 3 and 4, there is also an inner central tube 80 whose axis coincides with the optical axis, and this tube 80 supports for rotary movement the pair of diaphragm rings 81 and 82 which form part of the diaphragm means and control the blades of the diaphragm. Only one of these blades 83 is shown in FIG. 3, for the sake of clarity, and the ring 81 fixedly carries a plurality of control pins 84 which respectively cooperate with the diaphragm blades, the pin 84 in FIG. 3 being shown extending into the control slot 85 which is formed in the blade 83. The ring 82 carries pivot pins 86 which respectively connect the diaphragm blades pivotally to the ring 82, and the blade 83 is shown in FIG. 3 pivotally connected by the pin 86 to diaphragm ring 82. Thus, with this embodiment also the diaphragm blades will move to change the aperture when there is relative movement between the diaphragm rings and the aperture will remain unchanged when these rings turn together as a unit.

The diaphragm ring 81 has an exposure time controlling portion in the form of a part of the ring 81 formed with a cutout one edge 87 of which forms a camming edge for controlling the exposure time, this edge 87 engaging the exposure time setting pin 88 to adjust the position of the latter according to the angular position of the ring 81. In addition, this ring 81 is formed with a cutout 89 receiving the pin 90 for the bulb or B position where the exposure time is manually determined by the manipulation of the shutter by the operator. This diaphragm ring 81 is fixedly connected to a manually engageable member 91 accessible at the exterior of the objective assembly so that the operator by turning the member 91 will manually control the angular position of the ring 81.

The ring 82 fixedly carries a projection 92 the outer end portion of which is located in the path of downward movement of the portion 112 of the light-responsive means which is identical to and operates in the same way as the light-responsive means of FIG. 1. A spring 93 is connected at its ends respectively to the rings 81 and 83 and yieldably maintains the edge 95 of the ring 81 in engagement with the pin 94 fixedly carried by the ring 82, so that the elements 92—95 form a releasable holding means releasably holding the rings 81 and 82 in a predetermined angular position relative to each other, and in this angular position the exposure aperture has its largest size as for example illustrated in FIG. 3. Thus, the spring 93 urges the ring 82 to turn in the direction opposite to that indicated by the arrow e in FIG. 3.

The objective assembly of FIG. 2 also includes an outer tube 96 coaxial with the inner tube 80 and supporting for rotary movement a manually operable means in the form of a ring 97. A leaf spring 98 is fixedly carried at one end by a stationary part of the assembly and has a V-shaped portion 99 cooperating with the notches 100 formed in the periphery of the ring 81 for yieldably retaining the ring 81 in the position to which it is manually turned by the operator, and this spring 98 has a free end portion 101 frictionally engaging the inner periphery of the manually turnable ring 97. Thus, the spring 98 cooperates with the notches 100 to form a means for releasably holding the ring 81 in a manually selected angular position.

The ring 97 is formed with a cutout in which a stationary pivot pin 102 is located, and this pivot pin supports a lever 103 for turning movement, this lever being provided at the exterior of the ring 97 with a manually engageable portion 104 accessible to the operator. The ring 97 also fixedly carries a pin 105 which is engaged by one leg of a wire spring 106 coiled at an intermediate portion about the pin 102 and bearing with its other leg against the portion 104 of the lever 103 to urge this lever to turn in the direction of the arrow f shown in FIG. 3. Extending perpendicularly from the lever 103 and fixed thereto as by being formed integrally therewith are a pair of projections 107 and 108, these projections extending parallel to the optical axis. The ring 82 is formed at its periphery with a notch 110 adapted to receive projection 107, and the projection 108 extends into an elongated arcuate slot 109 formed in the ring 81 and extending along a circle whose center is in the optical axis, this slot 109 having at one end a notch 109a for receiving the projection 108 in the position of the parts shown in FIG. 3. It will be noted that in the illustrated position of the parts the spring 106 urges the projection 108 into and retains it in the notch 109a, while the projection 107 is displaced from the notch 110 of the ring 82.

The light-responsive means of FIG. 3, which cooperates with the projection 92, is identical with that of FIG. 1, as pointed out above, and includes the vertically movable rod 111 carrying at its lower end the enlarged portion 112 which is adapted to directly engage the projection 92. The rod 111 fixedly carries the scanning plate 113, and a spring 114 is fixed at its upper end to a plate which is fixed to and extends from the top end of the rod 111, this spring 114 being fixed at its lower end to a stationary part of the camera so that the spring 114 urges the rod 111 to move downwardly in the direction of the arrow g shown in FIG. 3. The vertically movable plunger 116 is fixed to the manually engageable member 117 and is urged upwardly to the rest position shown in FIG. 3 by the spring 118 the lower end of which is fixed to the plunger 116 and the upper end of which is fixed to a stationary part of the camera, this spring 118 of course being stronger than the spring 114. The plunger 116 fixedly carries at its upper end a plate 115 extending beneath and engaging the plate fixed to the upper end of the rod 111, so that in the rest position of the light-responsive means shown in FIG. 3 the rod 111 is maintained in its upper position with the spring 114 tensioned. The scanning plate 113 cooperates with the pointer 119 of the light meter 120, and this pointer 119 is freely movable over the stationary support 121 located at a slight distance below the pointer 119 out of the path of movement of the scanning plate 113, so that the support 121 limits the extent to which the scanning plate 113 can deflect the pointer 119. The meter 120 is supported for turning movement about its axis and is fixed coaxially to a rod 122 which extends upwardly to the exterior of the camera where this rod is fixed to the manually engageable knob 123 so that the angular position of the meter 120 may be manually adjusted. As is shown particularly in FIG. 4, the knob 123 carries an index 124 cooperating with a scale of film speeds 126 carried by the top wall 125 of the camera, so that in this way the operator knows where to set the pointer 124 in accordance with the film speed.

The meter 120 is provided with an additional pointer 127 which moves together with the pointer 119 and which has a free end portion visible beneath a window 128 carried by the wall 125 in an opening thereof. The upper free end of the pointer 127 is freely movable between the window 128 and an arcuate plate fixed to the underside of the wall 125 and carrying at its upper face which is beneath the window 128 the scale 129 of light values so that the pointer 127 cooperates with this scale.

In order to set the camera, a stationary scale 30 of exposure times is provided, as shown at the lower portion of FIG. 3, this scale being carried by any suitable part of the camera such as its front wall, and the manually turnable ring 97 directly carries a scale 131 of aperture sizes. In addition, there is located at one end of the scale 131 the graduation A indicating the automatic setting of the ring 97. The scales 130 and 131 both cooperate with a single index 132 carried by the diaphragm ring 81. Thus, the pair of indicating portions which cooperate with the indicating portions formed by the scales 130 and 131 are in fact, in the embodiment of FIG. 3, combined into a single part of the ring 81 which carries the index 132 which is common to the scales 130 and 131. Moreover, the ring 97 carries a scale 133 of light values which cooperates with a stationary index 134 which, for example, may be carried by the front wall of the camera.

In order to place the camera in a condition ready for operation, after the film is introduced into the camera the knob 123 is turned until the index 124 is aligned with that graduation of the scale 126 which corresponds to the speed of the film which has been placed in the camera, and of course at this time the angular position of the light meter 120 together with the pointers 119 and 127 are adjusted in accordance with the film speed.

In order to make an exposure with automatic determination of the aperture of the diaphragm means, the manually engageable means 91 is turned until the index 132 is aligned with that graduation of the scale 130 which indicates the selected exposure time. At this time the projection 108 is located within the notch 109a so that as the operator turns the diaphragm ring 81 to align the index 132 carried thereby with the selected graduation of the scale 130, the lever 103 connects through projection 108 and notch 109a the ring 97 to the ring 81 for turning movement therewith. The edge portion 95 of the ring 81 since it is maintained by the spring 93 in engagement with the pin 94 of the ring 82 will cause this ring 82 to turn together with the ring 81 without any relative turning between the rings 81 and 82, so that the diaphragm aperture will remain unchanged. Of course, when the projection 108 is in the notch 109a the index 132 is necessarily aligned with the graduation A of the scale 131 so that the camera is set for automatic determination of the exposure aperture. Therefore, all that happens at this time is that the camming edge 87 moves with respect to the pin 88 to adjust this pin to provide the selected exposure time.

With the manual selection of an exposure time having thus been made, the operator simply moves the element 117 downwardly so that the light-responsive means will operate automatically to turn the projection 92 of the ring 82 through a distance determined by the lighting conditions, and of course at this time the ring 82 will be automatically turned in the direction of the arrow e in opposition to the spring 93, the releasable holding means 98–100 acting at this time to maintain the ring 81 stationary so that the exposure time does not change. Of course, the spring 114 is stronger than the spring 93 so that the light-responsive means will maintain the ring 82 in the angular position determined by engagement of the scanning member 113 with the pointer 119, in the same way that the spring 43 of FIG. 1 is stronger than the spring 13 so that the scanning means of FIG. 1 is also capable of maintaining the ring 3 of FIG. 1 in the position to which it is automatically turned.

With the element 117 maintained in its depressed position, so that the aperture is automatically determined in the above-described manner, the operator will actuate the plunger of the shutter operating mechanism to release the shutter so as to make an exposure, and after the exposure is made the element 117 is released so that the spring 118 returns the plunger 116 to its rest position and of course the entire light-responsive means will return to the rest position thereof indicated in FIG. 3. This operation is identical with that described above in connection with FIG. 1.

It is also possible with the embodiment of FIG. 3 to provide a manual setting of the exposure time and aperture in accordance with the light measured by the light meter 120. In order to operate the camera in this manner the operator notes the graduation of the scale 129 with which the pointer 127 is in alignment. This light values shown on the scale 129 by the pointer 127 is then set manually into the camera by turning the rings 97 and 81 so that the graduation of the scale 133 which is the same as that graduation of the scale 129 indicated by the pointer 127 is manually placed in alignment with the index 134. Of course under some conditions where unusual situations are present the operator may wish to provide the next higher or the next lower light value as compared to that indicated by the cooperation of the pointer 127 with the scale 129. For example, when the camera is pointed directly into the sun, such a variation will be made, and this is done simply by aligning the selected graduation of the scale 133 with the index 134.

When operating the camera in this manner the operator will first provide a preselected exposure time by turning the element 91 so as to turn the ring 81 which through the connection 108, 109a and the lever 103 will result in simultaneous turning of the ring 97 and which through the releasable holding means 93—95 will also result in simultaneous turning of the ring 82 so that the aperture remains unchanged. When the exposure time has thus been selected, by alignment of the index 132 with the selected graduation of the scale 130, the operator will depress the portion 104 of the lever 103 in opposition to the spring 106 so as to displace the projection 108 out of the notch 109a and instead move the projection 107 into the notch 110. Thus, the ring 82 will now be releasably connected to the ring 97. At this time the projection 108 will be in alignment with and located within the arcuate slot 109. Turning of the ring 97 while maintaining the portion 104 of the lever 103 depressed in this manner will result in simultaneous turning of the ring 82 because of its connection at this time with the ring 97, and the projection 108 will simply move freely along the slot 109 without moving the ring 81 out of the angular position in which it is releasably held by the releasable holding means 98—100. The turning of the rings 97 and 82 in this manner continues until the graduation of the scale 133 which corresponds to that of the scale 129 is aligned with the index 134, in accordance with the position of the pointer 127 with respect to the scale 129. After the operator has placed the selected graduation of the scale 133 in alignment with the index 134, the operator can read from the scales 131 and 130 as well as the index 132 the combination of exposure time and aperture providing the particular light value which is aligned with the index 134. Assuming, for example, that a preselection of an exposure time of $\frac{1}{125}$ sec. is made and that from the cooperation of the pointer 127 and the scale 129 the operator determines that the light value 13 of the scale 133 should be aligned with the index 134, then with the selected exposure time of $\frac{1}{125}$ sec, and with the graduation 13 of the scale 133 aligned with the index 134, the exposure aperture will be 8. In other words, the graduation 8 of the scale 131 will at this time be aligned with the graduation 125 of the scale 130. It is now possible for the operator, while maintaining the light value 13 to change the combinations of exposure time and aperture which will provide this light value, and this is done by turning the manually engageable means 91 and the ring 81 therewith. Thus, at this time the ring 97 will of course remain stationary with, in this particular example, the graduation 13 of the scale 133 aligned with the index 134, and of course because the projection 107 is in the notch 110, the ring 82 will also remain stationary at this time. However, by turning the ring 81 manually it is possible to simultaneously change both the exposure time and the aperture with the combinations of exposure time and aperture always providing the light value 13. Thus, in the above example if the ring 81 is turned in a clockwise direction, as viewed in FIG. 3, the index 132 will move from the graduations 8 and 125 of the scale 131 and 130, respectively, in succession to the aligned pairs of graduations 11 and 16, and then to the pair of graduations 16 and 30 of the scales 131 and 130, so that the exposure aperture and exposure time are constantly changing while maintaining the light value of 13. Of course, the operator need only maintain the portion 104 of the lever 103 manually depressed until the projection 108 moves along the slot 109 beyond the notch 109a. At this time the outer edge of the slot 109 will cooperate with the projection 108 to maintain the projection 107 within the notch 110, so that the lever 103 is now maintained without manual engagement of the portion 104 thereof in an angular position coupling the ring 82 to the ring 97. Moreover, the frictional resistance to turning of the ring 97, the lever 103, and the ring 82 coupled thereto exerted by the free end portion 101 at this time is sufficient to prevent the spring 93 from returning the parts from the position to which they are turned by the operator. Of course the ring 81 is maintained in its angular position by the releasable holding means 98—100.

In the same way, it is possible in the case of making exposures with flash illumination, for example, to make an adjustment of the exposure time and aperture in a purely manual manner without using the light value scale 133.

Of course, as soon as the parts again reach a position where the notch 109a is aligned with the projection 108, the spring 106 will return the lever 103 to the position indicated in FIG. 3 and the projection 107 will no longer be located in the notch 110.

In the above-described embodiments of the invention the exposure time is preselected and the aperture is automatically determined, or both the aperture and the exposure time can be manually determined. In the embodiment of the invention shown in FIG. 5, as well as in the variation illustrated in FIG. 6, it is possible not only to provide automatic or manual determination of the aperture when the exposure time is manually determined, but in addition it is also possible, if desired, to provide a manual preselection of the aperture and to then provide automatic determination of the exposure time.

Figure 5:
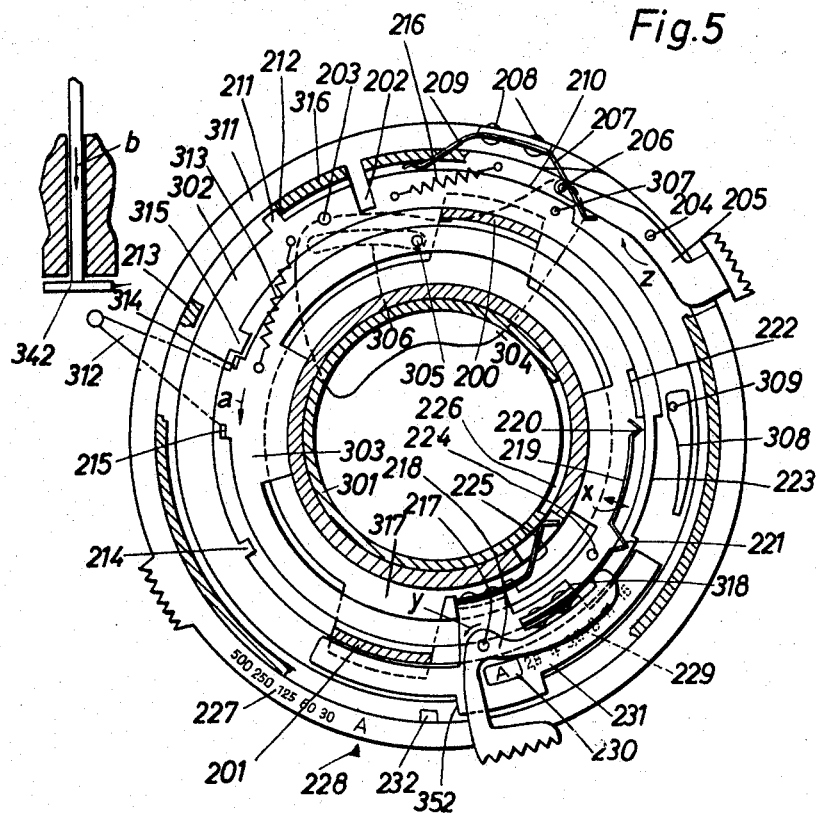
FIG. 5 is a fragmentary partly sectional elevational view of yet another embodiment of a structure according to the present invention.

Referring to FIG. 5, the central inner tube 301 has its axis coinciding with the axis of the objective, and a manually operable rotary diaphragm setting means 317 is turnably carried by the tube 301, and in addition this tube 301 serves to turnably support one of the rotary diaphragm rings 303 of the diaphragm means of said embodiment. The rotary manually operable means 317 has a pair of axially extending arcuate portions 200 and 201 which form portions of a cylinder whose axis coincides with the optical axis. The diaphragm ring 302 of the diaphragm means of FIG. 5 is supported for rotary movement by these portions 200 and 201 of the manually operable rotary means 317. A stationary outer tube 316 which is coaxial with the tube 301 serves to support for rotary movement a manually operable exposure time setting means 311 in the form of a ring turnably supported by the tube 316.

The diaphragm ring 303 carries a plurality of pins 305 which respectively correspond to the number of diaphragm blades 304, only one pin 305 and one blade 304 being shown for the sake of clarity, and these pins 305 respectively extend into the slots 306 of the several diaphragm blades 304. Moreover, these blades 304 are pivotally connected by pivot pins 307, respectively, to the diaphragm ring 302.

The rotary manually turnable ring 311 fixedly carries an inwardly directed projection 202 extending through a suitable slot of the tube 316, and in the path of turning of the projection 202 is located a pin 203 which is fixedly carried by the diaphragm ring 302. In addition the ring 311 carries an inwardly directed projection 232, shown at the lower part of FIG. 5, and this projection 232 cooperates with an edge portion 352 of the manually operable aperture setting means 317 so that when the ring 311 is turned in the direction of the arrow $a$ the projections 202 and 232 will respectively engage the projection 203 and 352 for providing simultaneous turning of the diaphragm rings 302 and 303 without any relative movement therebetween so that the aperture will remain unchanged while the exposure time is set by this turning of the ring 311.

The ring 311 fixedly carries a pivot pin 204 which serves to support for turning movement a lever 205 having a free end portion accessible to the operator and having an opposite end portion carrying a pin 206 which, when the lever 205 is turned by the operator in the direction of the arrow z, engages a leaf spring 207 to turn this leaf spring, the leaf spring 207 being fixedly carried by the ring 311. For example, rivets 208 may connect the leaf spring 207 to the ring 311 for rotary movement therewith, these rivets being located at a central portion of the spring 207. The other free end portion of the spring 207 is shown at 209 and is in the form of a brake since it slidably engages with a certain friction the inner surface of the tube 316 and thus provides a frictional resistance to the turning of the ring 311 with respect to the tube 316. The free end portion of the spring 207 which is acted upon by the pin 206 of the lever 205 cooperates with the outer peripheral portion 210 of the diaphragm ring 302 to provide when the leaf spring is released a frictional resistance to turning of the ring 311 and the ring 302 one with respect to the other.

The diaphragm ring 302 has an outwardly directed radial projection 211 which extends between a pair of stop portions 212 and 213. These stop portions 212 and 213 which form the ends of an elongated cutout of the tube 316 in which the projection 211 is located cooperate with the projection 211 to guarantee that the ring 302 will only turn through a predetermined angular range and will not be capable of turning beyond this range. The ring 302 of the embodiment of FIG. 5 is that ring which is operatively connected to the exposure time setting means for adjusting the exposure time when the ring 302 turns, and for this purpose the ring 302 is formed with a cutout having the camming edge 308 which coperates with the pin 309 of the retarding mechanism. The ring 302 further includes a pair of inwardly directed projections 214 and 315 between which is located the axially extending projections 314 and 215 of the other diaphragm ring 303, so that the projections 214 and 215 cooperate to limit the relative turning of the rings 302 and 303 in one direction while the projections 314 and 315 cooperate to limit the relative turning of the rings 302 and 303 in the opposite directions. In this way the turning of the ring 303 beyond a certain range with respect to the ring 302, or the turning of the ring 302 beyond a certain range with respect to the ring 303, is reliably avoided. The ring 303 fixedly carries a projection 312 cooperating with the portion 342 of the vertically movable rod of the light-responsive means which is identical with the light-responsive means described above.

In the embodiment of FIG. 5, the rotary diaphragm ring 302 is connected to one end of a spring 216 whose opposite end is fixed to a stationary part of the camera, so that the spring 216 urges the ring 302 to turn to a predetermined rest position, and the turning of the ring 302 by the spring 216 is limited by engagement of the projection 211 with the stop portion 212 of the tube 316. In addition, there is provided a releasable holding means for releasably holding the pair of diaphragm rings in a predetermined position relative to each other, and this releasable holding means includes the spring 313 operatively connected at its ends respectively to the rings 302 and 303, this spring 313 maintaining the projecting portions 314 and 315 in engagement with each other, as illustrated in FIG. 5.

The rotary manually operable means 317 carries a pivot pin 217 which extends parallel to the optical axis and which serves to pivotally support a lever 218 having a manually engageable portion accessible at the exterior of the assembly. The opposite end of the lever 218 engages an elongated leaf spring 219 which is fixed at one end to the member 317, and this spring 219 forms part of a releasable holding means for releasably holding the rings 302 and 303 in given angular positions relative to each other. The spring 219 has a pair of V-shaped portions 220 and 221 longitudinally displaced from each other along the spring 219 and also located respectively in these planes of the rings 302 and 303. The portion 221 of the spring 219 is adapted to cooperate with the surface portion 223 of the diaphragm ring 302, while the portion 220 is adapted to cooperate with the inwardly directed surface portion 222 of the rotary diaphragm ring 303. When these portions 220 and 221 respectively press frictionally against the portions 222 and 223 of the rings 303 and 302, respectively, these rings will be maintained by the releasable holding means in an angular position with respect to each other in which they are placed by the structure of FIG. 5. When the lever 218 is turned in the direction of the arrow $y$ by inwardly directed pressure on the manually engageable portion of the lever 218, this lever 218 will deflect the spring 219 in the direction of the arrow x of FIG. 5 inwardly toward the optical axis so as to move the portions 220 and 221 away from the surfaces 222 and 223, respectively, so that in this way the releasable holding means may be manually released to free the rings 302 and 303 for movement one relative to the other.

The rotary member 317 is also provided with an edge portion 318 extending radially with respect to the optical axis and a pin 224 which is carried by the diaphragm ring 303 is located in the path of turning movement of the edge 318 so that after the member 317 is turned in the direction of the arrow $a$ through a relatively short distance the edge 318 will engage the pin 224 and turn the ring 303. In addition, the member 317 fixedly carries a leaf spring 225 which in the rest position of the member 317, where this member is located for automatic operation of the camera, frictionally engages the exterior surface of the inner tube 301, so that in this way the spring 225 serves to frictionally retain the member 317 in the angular position in which it is placed by the operator for automatic operation. When the member 317 is turned in the direction of the arrow *a* through a relatively short distance the free end of the spring 225 will reach the elongated cutout 226 into which the spring 225 moves so that the frictional resistance to turning of the ring 317 is eliminated and is present only when the member 317 is in the position shown in FIG. 5 where it is set to provide automatic operation of the camera.

The manually operable rotary exposure time setting ring 311 carries a scale 227 of exposure times, and this scale also includes a graduation A indicating the setting for automatic operation, and all of the graduations of the scale 227 are adapted to cooperate with a stationary index 228 carried by a stationary part of the camera. A further scale of aperture sizes, scale 229, also includes a symbol A for automatic operation and is carried by the rotary diaphragm ring 302. The scale 229 is covered by an indicating portion 231 of the rotary member 317, this indicating portion 231 turning with the member 317 and being formed with a window 230 through which a selected graduation of the scale 229 is visible, and in the position shown in FIG. 5 the graduations A of both of the scales 227 and 229 are respectively aligned with the index 228 and the window 230.

Thus, the parts are shown in FIG. 5 in the positions where they are set to provide automatic determination of both the exposure time and the aperture. When the light-responsive means is actuated by the operator to provide an automatic operation in the manner described above in connection with FIGS. 1 and 3, the downwardly moving portion 342 of the light-responsive means engages the projection 312 and turns the ring 303 in the direction of the arrow *a*. The spring 216 is stronger than the spring 313 so that the ring 302 will remain stationary while the ring 303 is turned in opposition to the spring 313 which becomes set at this time and of course the projection 314 of the ring 303 moves away from the projection 315 of the ring 302, so that during this initial portion of the automatic operation the aperture of the diaphragm means is continually reduced in size while the exposure time remains constant. The aperture will be reduced to its smallest size when the projection 215 of the ring 303 reaches the projection 214 of the ring 302. If the lighting conditions and film speed are such that the portion 342 of the light-responsive means continues to move downwardly after the projection 215 engages the projection 214, then the ring 302 will turn in opposition to the spring 216 together with the ring 303 and the aperture will remain unchanged at its smallest size while the camming edge 308 moves along the pin 309 to adjust the position of this pin so as to change the exposure time, and when the light-responsive means stops operating, by engagement of the scanning member with the pointer of the light meter, both the aperture and the exposure time will have been automatically set at sizes which will provide a proper exposure in a fully automatic manner.

After the shutter has been actuated to make the exposure with the automatic setting of the aperture and exposure time, the parts are released so that the light-responsive means returns automatically to its rest position, as described above in connection with FIGS. 1 and 3, and the springs 313 and 216 return the rings 303 and 302, respectively, to their initial positions where the projection 211 of the ring 302 engages the stop portion 212 and where the projection 314 of the ring 303 engages the projection 315 of the ring 302.

Figure 6:
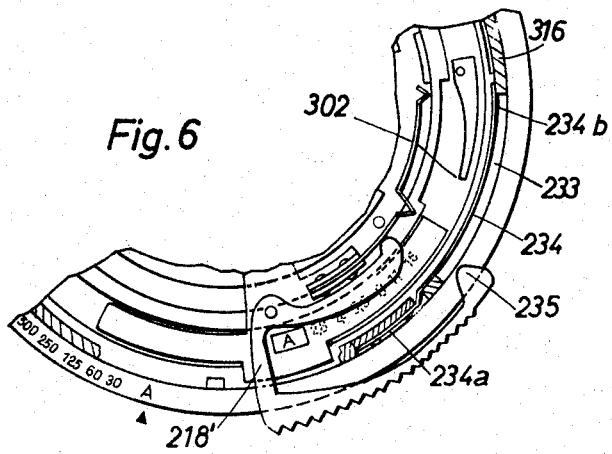
FIG. 6 fragmentarily illustrates a variation in the structure of FIG. 5.

With this arrangement the aperture is first reduced in size and then the exposure time is automatically reduced. It is an extremely simple matter to reverse the arrangement so that during full automatic operation the exposure time first is reduced from a value of, for example, $\frac{1}{30}$ sec. up to about a value of, for example, $\frac{1}{250}$ sec., and then the aperture can be reduced from, for example, 2.8 up to 22. All that is required to bring about this reversal in the operation is to make the spring 313 stronger than the spring 216. In this event when the light-responsive means acts on the arm 312 to move this arm downwardly, the spring 216 will yield before the spring 313 and as a result both of the rings 302 and 303 will turn together during the initial portion of the operation of the light-responsive means so that first the exposure time will first be reduced. When the projection 211 engages the stop 215 the ring 302 will be incapable of turning further so that the continued movement of the arm 312 will result in turning of the ring 303 in opposition to the spring 313 so that the aperture will now be reduced. Of course, if the structure is reversed in this manner, then it is necessary to provide a structure which will hold the ring 302 stationary while the ring 303 is turned during manual setting of the diaphragm, and for this purpose the structure shown in FIG. 6 is provided. Referring to FIG. 6 it will be seen that the tube 316 is formed with an elongated cutout 233 and that an elongated spring 234 is fixed at its end 234*a* to the tube 316 and bears at its end 234*b* against the inner surface of the tube 316. The lever 218' of FIG. 6, which corresponds to the lever 218 of FIG. 5, is provided with a projection 235 which, when the operator depresses the outer end of the lever 218' inwardly to turn this lever in a counterclockwise direction, as viewed in FIG. 6, engages the spring 234 and presses it against the outer periphery of the ring 302. Thus, when the lever 218' of FIG. 6 is actuated by the operator the portion 235 thereof will press the spring 234 against the outer periphery of the ring 302 so that this ring 302, even though the spring 216 is weaker than the spring 313, will remain stationary during turning of the ring 303 in order to manually set the aperture. When the lever 218' is released the spring 234 returns to the position shown in FIG. 6.

Assuming now that the structure is as shown in FIG. 5 with the spring 216 stronger than the spring 313 and that it is desired to make an exposure with a preselection of the aperture so that the exposure time will be automatically determined, then the lever 218 is turned by the operator in the direction of the arrow *y* about the pin 217. This results in deflection of the holding spring 219 in the direction of the arrow *x*. Now the lever 218 is turned together with the rotary member 317 in the direction of the arrow *a* so that the window 230 moves along the scale 229. The angular distance between the graduation A and the next graduation of the scale 229 is exactly equal to the angular distance through which the portion 318 of member 317 must move in order to engage the pin 224, so that there is no actual turning of the ring 303 until the member 317 has actually started to displace the pin 224 and the ring 303 therewith. Thus, until the edge 318 of the member 317 engages and moves the pin 224 there is no change either in the aperture or in the exposure time. All that happens is that the spring 225 moves along the surface of the tube 301 and then reaches the elongated slot 226. From this point on the member 317 is very easy to move in order to manually set the diaphragm.

When the member 317 is moved beyond the distance required to place the portion 318 in engagement with the pin 224, the ring 303 will of course turn in order to change the diaphragm since at this time the spring 216 will maintain the ring 302 stationary, this spring 216 being stronger than the spring 313, as pointed out above. When the selected size of the exposure aperture appears in the window 230, the lever 218 is released by the operator and the portions 220 and 221 of the holding spring 219 can now frictionally engage the surfaces 222 and 223, respectively, and since the frictional force provided by the spring 219 is greater than the maximum force which is exerted by the spring 13 when it is fully tensioned, the ring 303 will remain in the position to which it is manually turned in this manner with respect to ring 302. The embodiment of FIG. 6 operates in exactly the same way except that in this embodiment where the spring 216 is weaker than the spring 313 the added force derived from the spring 234 is sufficient to guarantee that the spring 313 will yield before the spring 216 so that the ring 303 also turns with respect to the ring 302, and then when the lever 218′ of FIG. 6 is released the spring 219 will again engage the surfaces 222 and 223 with a force which in this case is sufficient to prevent return of the ring 303 to its initial position with respect to the ring 302 by the spring 313 which is stronger in this case.

With the aperture thus manually set, the operator will again release the light-responsive means to act upon the arm 312 of the ring 303, and this ring will now be turned by the light-responsive means in the direction of the arrow a. However, since the holding means 219—223 maintains the rings 303 and 302 in the preselected angular position relative to each other with a force greater than that which can be provided by the spring 313 or the spring 216, both of the rings 302 and 303 necessarily turn as a unit without any relative turning therebetween during the downward movement of the arm 312 by the light-responsive means, so that the aperture remains unchanged at the manually selected setting while only the exposure time changes as a result of the turning of the ring 302.

If it is desired to provide an operation where the exposure time is manually preselected and the aperture is automatically determined, then assuming that the parts are in the position shown in FIG. 5, the operator will depress the exterior end of the lever 205 inwardly so as to turn the lever 205 about the pin 204 in the direction of the arrow z, and in this way the right free end portion of the spring 207, as viewed in FIG. 5, is turned outwardly away from the optical axis. The ring 311 is now manually turned in the direction of the arrow a, and during the initial portion of the turning of the ring 311 no movement of the ring 302 will take place until the projection 202 of the ring 311 engages and moves the pin 203 which is fixed to the ring 302. The angular distance through which the projection 202 must turn from the position shown in FIG. 5 in order to engage the pin 203 is exactly equal to the angular distance through which the ring 311 must be turned in order to move the graduation A away from the index 228 and locate the first exposure time graduation in alignment with the index 228. This is also the distance through which the ring 311 must be manually turned in order to place the projection 232 of the ring 211 in engagement with the edge portion 352 of the element 317. The turning of the ring 311 beyond the position where the projection 202 engages the pin 203 and the projection 232 engages the edge 352 will result in turning of the ring 302 and the rotary member 317 therewith, and since the spring 313 maintains the projections 314 and 315 in engagement with each other the ring 303 turns also together with the ring 302 so that the aperture remains unchanged while the exposure time is manually set in this manner. When the operator has placed the selected exposure time of the scale 227 in alignment with the index 228, the operator releases the lever 205 and the spring 207 immediately engages the peripheral portion 210 of the ring 302 with a force sufficient to prevent the spring 216 from returning the ring 302 to its starting position, and thus the manually set exposure time will remain unchanged. Of course the distance through which the projection 202 moves from the position shown in FIG. 5 before engaging the pin 203 is sufficient to place the right free end of the spring 207, as viewed in FIG. 5, over the outer peripheral portion 210 of the ring 302.

When the light-responsive means is now released for operation by the operator, the arm 312 will again be moved downwardly and the ring 303 at this time will turn with respect to the ring 302 which is maintained stationary by the engagement of the spring 207 with the peripheral portion 210 of the ring 302, so that in this way the aperture will be automatically set.

Of course, when the exposure has been made the light-responsive means will return to its initial position and the ring 303 will be returned by the spring 13 to the position where its projection 314 engages the projection 315. The ring 302 will remain in the position to which it has been manually moved, and in the event that the operator desires to again have automatic determination of the exposure time or to provide a different exposure time it is best for the operator to turn the ring 311 in order to locate the proper graduation of the scale 227 in alignment with the index 228.

In the event that it is desired to make an exposure where both the exposure time and the aperture are manually set, then, for example, the ring 311 may be turned first so as to locate the desired exposure time in alignment with the index 228. The exposure time will now be manually set in exactly the manner described above where the exposure time was manually set while the aperture was automatically determined. Then the operator will turn the lever 218 and turn the member 317 so as to set the aperture manually in exactly the manner described above in connection with manual setting of the aperture while the exposure time was automatically determined, and in this way both the aperture and the exposure time can be manually set in order to provide complete manual operation. The stop portions 212 and 213 cooperate with the projection 211 to guarantee that the exposure time setting structure cannot be moved beyond the proper range provided for setting the exposure time, and in the same way the projections 214 and 315 cooperate respectively with the projections 215 and 314 to guarantee that the aperture will be manually set only within the proper range of settings within the capacity of the camera.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, diaphragm means including a pair of rotary diaphragm rings operatively connected to blades of the diaphragm for maintaining a given diaphragm aperture when said rings do not change their angular position relative to each other and for moving the blades of the diaphragm to change the aperture thereof when at least one of the rings turns relative to the other; exposure time setting means operatively connected to one of said rings so that when both rings turn together the exposure time will be set without changing the aperture of the diaphragm means while when the other of said rings turns relative to said one ring the aperture will change while the exposure time remains unchanged; and light-responsive means cooperating with said other ring for turning the latter.

2. In a camera, in combination, diaphragm means including a pair of rotary diaphragm rings operatively connected to blades of the diaphragm for maintaining a given diaphragm aperture when said rings do not change their angular position relative to each other and for moving the blades of the diaphragm to change the aperture thereof when at least one of the rings turns relative to the other; exposure time setting means operatively connected to one of said rings so that when both rings turn together the exposure time will be set without changing the aperture of the diaphragm means while when the other of said rings turns relative to said one ring the aperture will change while the exposure time remains unchanged; light-responsive means cooperating with said other ring for turning the latter; manually operable means connected to said one ring for turning the latter to set the exposure time; and releasable holding means releasably holding said rings together so that they turn as a unit during turning of said one ring by said manually operable means, so that the aperture remains unchanged during manual setting of the exposure time.

3. In a camera, in combination, diaphragm means including a pair of rotary diaphragm rings operatively connected to blades of the diaphragm for maintaining a given diaphragm aperture when said rings do not change their angular position relative to each other and for moving the blades of the diaphragm to change the aperture thereof when at least one of the rings turns relative to the other; exposure time setting means operatively connected to one of said rings so that when both rings turn together the exposure time will be set without changing the aperture of the diaphragm means while when the other of said rings turns relative to said one ring the aperture will change while the exposure time remains unchanged; light-responsive means cooperating with said other ring for turning the latter; manually operable means connected to said one ring for turning the latter to set the exposure time; releasable holding means releasably holding said rings together so that they turn as a unit during turning of said one ring by said manually operable means, so that the aperture remains unchanged during manual setting of the exposure time; and releasable holding means cooperating with said one ring for releasably holding the same stationary while said light-responsive means cooperates with said other ring to turn the latter, whereby the aperture will be automatically determined.

4. In a camera, in combination, diaphragm means including a pair of rotary diaphragm rings operatively connected to blades of the diaphragm for maintaining a given diaphragm aperture when said rings do not change their angular position relative to each other and for moving the blades of the diaphragm to change the aperture thereof when at least one of the rings turns relative to the other; exposure time setting means operatively connected to one of said rings so that when both rings turn together the exposure time will be set without changing the aperture of the diaphragm means while when the other of said rings turns relative to said one ring the aperture will change while the exposure time remains unchanged; light-responsive means cooperating with said other ring for turning the latter; manually operable means operatively connected to said other ring for turning the latter; first releasable holding means releasably holding said one ring stationary while said other ring is turned by said manually operable means so that the aperture will be manually set; and second releasable holding means holding said rings in the angular position they take with respect to each other after turning of said other ring by said manually operable means, so that when said light-responsive means turns said other ring both of said rings will turn as a unit to set the exposure time automatically.

5. In a camera, in combination, diaphragm means including a pair of rotary diaphragm rings operatively connected to blades of the diaphragm for turning movement together without changing the aperture of the diaphragm or for turning movement relative to each other to change the aperture of the diaphragm; exposure time setting means operatively connected to one of said rings so that the exposure time is changed during turning of said one ring; light-responsive means operatively connected to the other of said rings for turning said other ring in response to lighting conditions; manually operable means cooperating with said rings for optionally turning them together or one with respect to the other for changing the exposure time without changing the aperture when both rings turn together, for changing the aperture and the exposure time when said one ring turns with respect to said other ring, and for changing only the aperture when said other ring turns with respect to said one ring; and control means cooperating with said rings for holding said one ring stationary while said light-responsive means turns said other ring to automatically set the diaphragm after the exposure time has been manually set, for holding both rings together for turning movement as a unit for automatically setting the exposure time during turning of said other ring by said light-responsive means after the aperture has been manually set, and for providing turning of said rings together and turning of said other ring relative to said one ring in a predetermined sequence for setting the camera in a fully automatic manner.

6. In a camera, in combination, diaphragm means including a pair of rotary diaphragm rings operatively connected to the blades of the diaphragm for maintaining the aperture of the diaphragm unchanged when both the rings turn together and for changing the aperture of the diaphragm when there is relative turning between said rings; exposure time setting means and light-responsive means respectively connected operatively with said rings so that the exposure time can be set upon turning of at least that ring which is operatively connected to said exposure time setting means and so that at least that ring which is operatively connected to said light-responsive means can be turned automatically; manually operable means operatively connected to at least one of said rings for turning at least one of said rings; and releasable holding means cooperating with said rings for releasably holding a predetermined one of said rings against turning movement and for releasably holding both of said rings together for turning movement as a unit, so that the camera may be set at least in part manually and at least in part automatically.

7. In a camera, in combination, diaphragm means including a pair of rotary diaphragm rings operatively connected to blades of the diaphragm for maintaining the diaphragm aperture unchanged when said rings turn together and for changing the aperture when at least one of said rings turns relative to the other; exposure time setting means operatively connected to one of said rings so that the exposure time will be set when said one ring turns; a pair of stop portions respectively carried by said rings; spring means operatively connected to said rings for urging them to turn in a direction which maintains said stop portions in engagement with each other, so that both of said rings will turn together while said spring means holds said stop portions in engagement with each other; manually operable means operatively connected to said one ring for turning the latter to set the exposure time, the diaphragm aperture remaining unchanged while said spring means holds said stop portions in engagement with each other and both of said rings turn together as a unit during setting of the exposure time; light-responsive means cooperating with the other of said rings for turning said other ring; and releasable holding means cooperating with said one ring for releasably holding the same in the angular position to which said one ring is manually turned by said manually operable means during turning of the other of said rings by said light-responsive means, said light-responsive means turning said other ring in opposition to said spring means in a direction moving the stop portion of said other ring away from the stop portion of said one ring, whereby the operator may set manually a preselected exposure time and the aperture will then be automatically determined by the light-responsive means acting on said other rings.

8. In a camera, in combination, diaphragm means including a pair of rotary diaphragm rings operatively connected to blades of the diaphragm for maintaining the diaphragm aperture unchanged when said rings turn together and for changing the aperture when at least one of said rings turns relative to the other; exposure time setting means operatively connected to one of said rings, so that when that ring which is operatively connected to the exposure time setting means turns the exposure time will be set; a projection fixed to and extending from the other of said rings; light meter means; scanning means for scanning said light meter means, said scanning means moving, during scanning, along a path in which said projection of said other ring is located so that said scanning means engages said projection to turn said other ring during scanning of said light meter means; manually operable means operatively connected to said other ring for turning the latter; releasable holding means cooperating with said one ring for maintaining said one ring stationary while said manually operable means turns the other of said rings, so as to change the exposure aperture; and scale means cooperating with said manually operable means and having graduations indicating the size of the exposure aperture and indicating the setting for automatic determination of the exposure aperture.

9. In a camera, in combination, diaphragm means including a pair of rotary diaphragm rings operatively connected to blades of the diaphragm for maintaining the diaphragm aperture unchanged when said rings turn together and for changing the aperture when at least one of said rings turns relative to the other; exposure time setting means operatively connected to one of said rings, so that when that ring which is operatively connected to the exposure time setting means turns the exposure time will be set; a projection fixed to and extending from the other of said rings; light meter means; scanning means for scanning said light meter means, said scanning means moving, during scanning, along a path in which said projection of said other ring is located so that said scanning means engages said projection to turn said other ring during scanning of said light meter means; manually operable means operatively connected to said other ring for turning the latter; releasable holding means cooperating with said one ring for maintaining said one ring stationary while said manually operable means turns the other of said rings, so as to change the exposure aperture; and scale means cooperating with said manually operable means and having graduations indicating the size of the exposure aperture and indicating the setting for automatic determination of the exposure aperture, said manually operable means cooperating with said other ring for turning the latter only in one direction.

10. In a camera, in combination, diaphragm means including a pair of rotary diaphragm rings operatively connected to blades of the diaphragm for maintaining the diaphragm aperture unchanged when said rings turn together and for changing the aperture when at least one of said rings turns relative to the other; exposure time setting means operatively connected to one of said rings, so that when that ring which is operatively connected to the exposure time setting means turns the exposure time will be set; a projection fixed to and extending from the other of said rings; light meter means; scanning means for scanning said light meter means, said scanning means moving, during scanning, along a path in which said projection of said other ring is located so that said scanning means engages said projection to turn said other ring during scanning of said light meter means; manually operable means operatively connected to said other ring for turning the latter; releasable holding means cooperating with said one ring for maintaining said one ring stationary while said manually operable means turns the other of said rings, so as to change the exposure aperture; scale means cooperating with said manually operable means and having graduations indicating the size of the exposure aperture and indicating the setting for automatic determination of the exposure aperture, said manually operable means cooperating with said other ring for turning the latter only in one direction; a pair of stop portions respectively carried by said rings; spring means operatively connected to said rings for holding said stop portions in engagement with each other, said manually operable means when turning said other ring turning the latter in opposition to said spring means and said releasable holding means holding said one ring in opposition to said spring means; and means actuated by said manually operable means for holding said other ring in the angular position to which it is turned by said manually operable means in opposition to said spring means.

11. In a camera as recited in claim 1, first releasable holding means cooperating with said rings for releasably holding the same against turning movement relative to each other; second releasable holding means cooperating with said one ring for releasably holding said one ring against turning movement; manually operable means; lever means turnably carried by said manually operable means, said lever means having a pair of projections and said rings respectively formed with cutouts one of which receives one of said projections when said lever means is in one position and the other of which receives the other of said projections when said lever means is in another position, whereby said manually operable means may be turned while said lever means connects said one ring to said manually operable means for turning both of said rings to set the exposure time without changing the aperture and whereby the connection between said manually operable means and said other ring may be released and said manually operable means may be connected to said other ring through said lever means for turning only said other ring in opposition to said first holding means while said second holding means holds said one ring stationary to set the exposure aperture while the exposure time remains unchanged, said light-responsive means cooperating with said other ring for turning the latter in opposition to said first holding means while said second holding means holds said one ring stationary, so that the aperture may be automatically set by said light-responsive means.

12. In a camera, in combination, diaphragm means including a pair of rotary diaphragm rings operatively connected to blades of the diaphragm for controlling said blades; exposure time setting ring operatively connected to one of said rings so that the exposure time will be set upon turning of said one ring; a projection fixed to and extending from the other of said rings; light-responsive means cooperating with said projection for acting on the latter to turn said other ring; first releasable holding means cooperating with said rings for releasably holding the same together for turning movement as a unit; second releasable holding means cooperating with said one ring for releasably holding said one ring against turning movement; manually engageable means extending from said one ring to be engaged by the operator so that the operator may manually turn said one ring; a manually turnable ring having a projection located adjacent said projection of said other ring so that when said third ring is manually turned in one direction said projection of said third ring will engage the projection of said other ring to turn the other ring, said third ring having a projection located next to said manually engageable means of said one ring to be engaged by said manually engageable means when the latter is turned together with said one ring, whereby said third ring will be turned with said one ring and said first mentioned projection of said third ring will engage the projection of said other ring to turn the latter with said one ring and said third ring, whereby only the exposure time will be changed and said one ring will be turned in opposition to said second releasable holding means, said light-responsive means cooperating with said projection to turn said other ring independently of said one ring in opposition to said first holding means while said second holding means holds said one ring at the position providing the selected exposure time; and third releasable holding means actuated by said third ring and cooperating with said other ring for holding said other ring in the position to which it is turned when said third ring moves independently of said manually engageable means for manually turning said other ring relative to said one ring for manually setting the aperture of said diaphragm means.

13. In a camera, as recited in claim 1, manually operable means operatively connected to said other ring for turning said other ring; and releasable holding means cooperating with said manually operable means and with said one ring for releasably holding the latter stationary while said manually operable means turns said other ring so that the diaphragm aperture will be changed while the exposure time remains constant, said releasable holding means including a peripheral portion of said one ring formed with notches, a stationary leaf spring having an intermediate portion cooperating with said notches, and said leaf spring having a free end portion frictionally engaging said manually operable means to be urged by the latter toward said periphery of said one ring and to frictionally resist operation of said manually operable means.

14. In a camera, in combination, diaphragm means including a pair of rotary diaphragm rings operatively connected to blades of the diaphragm for controlling said blades; exposure time setting means operatively connected to one of said rings for setting the exposure time in response to turning of said one ring; light-responsive means cooperating with the other of said rings for turning the latter; rotary manually operable means coaxial with said rings and operatively connected to said other ring for manually turning the latter, said rings when they turn as a unit setting the exposure time between said one ring while the aperture remains unchanged and said other ring when turned with respect to said one ring changing the aperture while the exposure time remains unchanged; a pair of aperture indicating portions connected to said one ring and said rotary manually operable means for turning movement therewith and located beside each other, one of said portions carrying an index and the other of said portions carrying a scale of aperture sizes, whereby the relative angular positions between said one ring and said rotary manually operable means will indicate through said indicating portions the size of the aperture of said diaphragm means; a stationary exposure time indicating portion and a rotary exposure time indicating portion, said rotary exposure time indicating portion being operatively connected to said one ring for assuming at all times angular positions indicating the angular position of said one ring, and said exposure time indicating portions respectively carrying an index and a scale of exposure times cooperating with each other for indicating the exposure time provided by said one ring.

15. In a camera as recited in claim 1, rotary manually operable means coaxial with said rings and operatively connected to said other ring for manually turning the latter; a pair of aperture indicating portions connected to said one ring and said rotary manually operable means for turning movement therewith and located beside each other, one of said portions carrying an index and the other of said portions carrying a scale of aperture sizes, whereby the relative angular positions between said one ring and said rotary manually operable means will indicate through said indicating portions the size of the aperture of said diaphragm means; a stationary exposure time indicating portion and a rotary exposure time indicating portion, said rotary exposure time indicating portion being operatively connected to said one ring for assuming at all times angular positions indicating the angular position of said one ring, and said exposure time indicating portions respectively carrying an index and a scale of exposure times cooperating with each other for indicating the exposure time provided by said one ring, one of said exposure time indicating portions and one of said aperture indicating portions coinciding with each other.

16. In a camera as recited in claim 15, said one of said exposure time indicating portions and said one of said aperture indicating portions being in the form of a single index common to the scale of diaphragm sizes and the scale of exposure times.

17. In a camera as recited in claim 1, rotary manually operable means coaxial with said rings and operatively connected to said other ring for manually turning the latter; a pair of aperture indicating portions connected to said one ring and said rotary manually operable means for turning movement therewith and located beside each other, one of said portions carrying an index and the other of said portions carrying a scale of aperture sizes, whereby the relative angular positions between said one ring and said rotary manually operable means will indicate through said indicating portions the size of the aperture of said diaphragm means; a stationary exposure time indicating portion and a rotary exposure time indicating portion, said rotary exposure time indicating portion being operatively connected to said one ring for assuming at all times angular positions indicating the angular position of said one ring, and said exposure time indicating portions respectively carrying an index and a scale of exposure times cooperating with each other for indicating the exposure time provided by said one ring; and a pair of light value indicating portions, one of said latter portions being stationary and the other of said latter portions being operatively connected to said rotary manually operable means for turning movement therewith, and said light value indicating portions respectively carrying an index and a scale of light values.

18. In a camera as recited in claim 1, manually operable means operatively connected to both of said rings for turning both of said rings either together so as to set the exposure time without changing the aperture or separately so as to turn said other ring while said one ring remains stationary so as to set the aperture while the exposure time remains unchanged; a pair of movable indicating members; transmission means operatively connected to said pair of rotary diaphragm rings and said pair of movable indicating members for moving the latter members with the same transmission ratio in response to turning said pair of diaphragm rings; a stationary portion located adjacent a portion of that movable member which is operatively connected to said one ring to move in response to moving said one ring, said portions respectively carrying an index and a scale of exposure times so that the relative positions of said portions will be indicative of the exposure time; and an indicating portion carried by the other of said movable members which moves in response to turning of said other ring and cooperating with said stationary portion and said portion of said member which moves in response to turning of said one ring for indicating at least whether the range in which the aperture of said diaphragm means is located is one which will provide a proper exposure under the particular lighting conditions.

19. In a camera as recited in claim 1, a pair of movable indicating members; transmission means connecting said rings to said members for moving the latter with exactly the same tranmission ratios in response to turning of said rings; a stationary portion carrying a scale of exposure times; an index carried by that movable member which is operatively connected to said one ring to move in response to turning of said one ring, said index cooperating with said scale for indicating the exposure time; and an indicating portion carried by the other of said movable members and cooperating with said index for indicating at least whether the aperture of said diaphragm means is within a range which will provide a proper exposure.

20. In a camera as recited in claim 19, said indicating portion of said indicating member which moves in response to turning of said other ring being in the form of a pair of contrasting fields one of which when aligned with said index indicating that a proper exposure can be made and the other of which when aligned with said index indication that a proper exposure cannot be made.

21. In a camera as recited in claim 19, said indicating portion of said movable member which moves in response to turning of said other diaphragm ring including a scale of aperture sizes cooperating with said index for indicating the particular aperture of said diaphragm means and portions located beyond said scale and cooperating with said index for indicating that a proper exposure cannot be made.

22. In a camera as recited in claim 1, a pair of movable indicating members each having a part visible in the viewfinder of the camera; transmission means operatively connected to said rings and said members for moving said members in response to turning of said rings with exactly the same transmission ratio; a stationary portion visible in the viewfinder and cooperating with that member which moves in response to turning of said one ring, said stationary portion carrying a scale of exposure times and the latter member carrying an index cooperating with said scale; and an indicating portion carried by that member which moves in response to turning of said other ring and cooperating with said index for indicating at least whether the aperture provided by the diaphragm means is in a range which will provide a proper exposure.

23. In a camera, in combination, diaphragm means including a pair of rotary diaphragm rings operatively connected to blades of the diaphragm for controlling said blades; exposure time setting means operatively connected to one of said rings for setting the exposure time in response to turning of said one ring; light-responsive means operatively connected to the other of said rings for turning said other ring; rotary manually operable means cooperating with said one ring for turning the latter to set the exposure time; releasable holding means cooperating with said one ring for releasably holding the latter in an angular position providing a selected exposure time; and manually engageable means carried by said rotary manually operable means and cooperating with said releasable holding means for actuating the latter to release said one ring to be turned by said manually operable means when the latter is actuated by the operator and releasing said holding means for holding said one ring when said manually operable means is not actuated by the operator.

24. In a camera, in combination, diaphragm means including a pair of rotary diaphragm rings operatively connected to diaphragm blades for controlling said blades; exposure time setting means operatively connected to one of said rings for setting the exposure time in response to turning of said one ring; light-responsive means operatively connected to the other of said rings for turning said other ring; rotary manually operable means cooperating with said one ring for turning the latter to set the exposure time; leaf spring means carried by said rotary manually operable means and cooperating with said one ring for maintaining the latter in the angular position to which it is moved in response to turning of said rotary manually operable means; and manually operable lever means carried by said rotary manually operable means and cooperating with said leaf spring means for actuating the latter to release said one ring for turning movement by said manually operable means.

25. In a camera, in combination, diaphragm means including a pair of rotary diaphragm rings operatively connected to diaphragm blades for controlling said blades; exposure time setting means operatively connected to one of said rings for setting the exposure time in response to turning of said one ring; light-responsive means operatively connected to the other of said rings for turning said other ring; rotary manually operable means cooperating with said one ring for turning the latter to set the exposure time; leaf spring means carried by said rotary manually operable means and cooperating with said one ring for maintaining the latter in the angular position to which it is moved in response to turning of said rotary manually operable means; and manually operable lever means carried by said rotary manually operable means and cooperating with said leaf spring means for actuating the latter to release said one ring for turning movement by said manually operable means; a housing in which said diaphragm means is located, and a portion of said leaf spring means frictionally engaging part of said housing.

26. In a camera, in combination, diaphragm means including a pair of rotary diaphragm rings operatively connected to blades of the diaphragm for controlling said blades; exposure time setting means operatively connected to one of said rings for setting the exposure time in response to turning of said one ring; light-responsive means operatively connected to the other of said rings for turning said other ring; rotary manually operable means cooperating with said one ring for turning the latter to set the exposure time; spring means cooperating with with one ring for urging the latter to a predetermined rest position; releasable holding means carried by said manually operable means and cooperating with said one ring for releasably holding the latter in opposition to said spring means in an angular position to which said one ring is moved by said manually operable means; and manually engagable means carried by said manually operable means and cooperating with said releasable holding means for actuating the latter to release said one ring for turning movement in opposition to said spring means by said manually operable means.

27. In a camera, in combination, diaphragm means including a pair of rotary diaphragm rings operatively connected to blades of the diaphragm for controlling said blades; exposure time setting means operatively connected to one of said rings for setting the exposure time in response to turning of said one ring; light-responsive means cooperating with the other of said rings for turning said other ring; rotary manually operable means cooperating with said other ring for turning the latter independently of said light-responsive means for manually setting the aperture of said diaphragm means; releasable holding means carried by said rotary manually operable means for turning movement therewith and frictionally cooperating with both of said rings for releasably holding said rings in a given angular position relative to each other providing a predetermined aperture of said diaphragm means; and manually operable lever means carried by said rotary manually operable means and cooperating with said releasable holding means for actuating the latter to release the engagement between said holding means and said rings during actuation of said manually operable means to change the aperture of said diaphragm means.

28. In a camera, in combination, diaphragm means including a pair of rotary diaphragm rings operatively connected to blades of the diaphragm for controlling said blades; exposure time setting means operatively connected to one of said rings for setting the exposure time in response to turning of said one ring; light-responsive means cooperating with the other of said rings for turning said other ring during automatic setting of the camera in response to lighting conditions; rotary manually operable means cooperating with said other ring for turning the latter manually, independently of said light-responsive means, for manually setting the diaphragm; and means resisting turning of said rotary manually operable means at least when the latter is in an angular position providing automatic operation of said other ring by said light-responsive means.

29. In a camera, in combination, diaphragm means including a pair of rotary diaphragm rings operatively connected to blades of the diaphragm for controlling said blades; exposure time setting means operatively connected to one of said rings for setting the exposure time in response to turning of said one ring; light-responsive means operatively connected to the other of said rings for turning said other ring; rotary manually operable means cooperating with the other of said rings for turning said other ring for manually setting the diaphragm; a scale of aperture sizes carried by said one ring and including a graduation for automatic operation; and an indicating portion carried by said manually operable means and cooperating with said scale for indicating the aperture of the diaphragm means and for indicating that the camera is set for automatic operation, said indicating portion being formed with a window through which said scale is visible at least in part.

30. In a camera, in combination, diaphragm means including a pair of rotary diaphragm rings operatively connected to blades of the diaphragm for controlling said blades; exposure time setting means operatively connected to one of said rings for setting the exposure time in response to turning of said one ring; light-responsive means operatively connected to the other of said rings for turning said other ring; rotary manual aperture setting means cooperating with the other of said diaphragm rings for turning said other ring during manual setting of the diaphragm; and rotary manual exposure time setting means having a pair of projections respectively cooperating with portions of said rotary manual aperture setting means and said one ring for simultaneously turning said manual aperture setting means and said one ring during turning of said manual exposure time setting means.

References Cited in the file of this patent

UNITED STATES PATENTS

| | | |
|---|---|---|
| 2,868,095 | Gebele | Jan. 13, 1959 |
| 2,911,897 | Fahl | Nov. 10, 1959 |
| 2,935,922 | Rentschler | May 10, 1960 |
| 3,013,478 | Gebele | Dec. 19, 1961 |
| 3,016,811 | Bundschuh | Jan. 16, 1962 |